United States Patent [19]

Reik

[11] Patent Number: 5,413,535
[45] Date of Patent: May 9, 1995

[54] APPARATUS FOR DAMPING VIBRATIONS

[75] Inventor: Wolfgang Reik, Bühl, Germany

[73] Assignee: Luk Lamellen und Kupplungsbau GmbH, Bühl, Germany

[21] Appl. No.: 228,655

[22] Filed: Apr. 18, 1994

[30] Foreign Application Priority Data

Apr. 20, 1993 [DE] Germany .................. 43 12 722.3

[51] Int. Cl.6 ............................................. F16F 15/00
[52] U.S. Cl. ........................... 474/94; 474/161; 474/174; 474/902; 74/87; 74/574
[58] Field of Search ............... 474/94, 112, 148, 161, 474/166, 174, 902; 74/87, 574

[56] References Cited

U.S. PATENT DOCUMENTS

| | | | |
|---|---|---|---|
| 3,910,137 | 10/1975 | Nedeljkovitch | 475/166 |
| 3,965,768 | 6/1976 | Foster | 474/135 X |
| 4,010,544 | 3/1977 | Siman | 30/381 |
| 4,077,233 | 3/1978 | Hornig et al. | 74/574 X |
| 4,728,315 | 3/1988 | Schlagmuller | 474/84 X |
| 4,788,884 | 12/1988 | Reik et al. | 74/574 |
| 4,947,707 | 8/1990 | Koenneker | 74/574 |
| 4,966,571 | 10/1990 | De Guillebon | 474/112 X |
| 5,111,714 | 5/1992 | Honoki et al. | 74/574 |

FOREIGN PATENT DOCUMENTS

| | | | |
|---|---|---|---|
| 3812375A1 | 10/1989 | Germany | F16H 7/08 |
| 4018596A1 | 12/1991 | Germany | F16D 3/76 |

Primary Examiner—Roger J. Schoeppel
Attorney, Agent, or Firm—Darby & Darby

[57] ABSTRACT

Vibrations of the camshaft or crankshaft of a combustion engine are damped between a composite pulley which receives torque from the engine and one or more sheaves which are driven by an endless flexible member and serve to transmit torque to a pump, a blower, a compressor, a steering wheel mechanism and/or an alternator. The endless flexible member exhibits a certain amount of elasticity and the composite pulley comprises a rotary input device which is driven by the engine and a hollow rotary wheel which has a circular radially inner portion in rolling contact with the periphery of the input device. The outer diameter of the input device is smaller than the inner diameter of the wheel. The latter performs pendulum movements in response to changes in the length of the elastic flexible member.

30 Claims, 4 Drawing Sheets

APPARATUS FOR DAMPING VIBRATIONS

BACKGROUND OF THE INVENTION

The invention relates to improvements in vibration damping apparatus, and more particularly to improvements in apparatus wherein a prime mover (such as an internal combustion engine) transmits torque to one or more driven components by way of one or more endless flexible elements in the form of chains, bands, belts or the like. Still more particularly, the invention relates to improvements in vibration damping apparatus which can be utilized with advantage in power trains connected between the output elements of engines in motor vehicles and one or more driven components, such as pumps, fans, power steering devices, alternators, compressors and/or others.

A vibration damping apparatus which can be installed in a power train between a combustion engine and one or more driven components in a motor vehicle is disclosed, for example, in published German patent application No. 40 18 596. In that application there is disclosed an endless flexible torque transmission member in the form of a belt that is trained over several pulleys or sheaves, one of which is concentric with and receives torque from the output element (e.g., a crankshaft) of the engine. The vibration damping apparatus includes a torque transmitting device which is installed between the output element of the engine and the respective sheave and permits such sheave and the output element to turn relative to each other. The torque transmitting device includes ring-shaped damping elements which are made of rubber. Certain other prior proposals include the provision of different damping elements such, as coil springs. A drawback of heretofore known vibration damping apparatus is that they are overly complex and not sufficiently versatile to ensure adequate damping of vibrations under all of a number of different circumstances which can arise during operation of a motor vehicle.

OBJECTS OF THE INVENTION

An object of the invention is to provide an apparatus for absorbing or damping vibrations which is simpler and more versatile than heretofore known apparatus.

Another object of the invention is to provide a vibration damping or absorbing apparatus which can be used with particular advantage between the engine of a motor vehicle and one or more aggregates (such as a pump, a fan, a compressor, an alternator and/or others) which receive torque from the engine.

A further object of the invention is to provide a motor vehicle which embodies a vibration damping or absorbing apparatus of the above-outlined character.

An additional object of the invention is to provide an apparatus which, in addition to its function of damping or absorbing vibrations or analogous undesirable stray movements, can also serve to perform one or more important ancillary functions.

Still another object of the invention is to provide a novel and improved tensioning apparatus for endless belts, bands, chains or other flexible transmission members.

A further object of the invention is to provide a novel and improved endless flexible torque transmission member which can be utilized in the above-outlined apparatus.

Another object of the invention is to provide a vibration absorbing apparatus which can perform the additional important function of a multi-speed transmission, for example, between a camshaft, a crankshaft or another rotary output element of a combustion engine and one or more aggregates under the hood of a motor vehicle.

An additional object of the invention is to provide a vibration absorbing or damping apparatus whose useful life is longer than that of heretofore known apparatus, which can be produced at a reasonable cost, which is not prone to malfunction and which can be utilized in existing types of motor vehicles or other machines.

SUMMARY OF THE INVENTION

The invention is embodied in an apparatus for absorbing or damping vibrations of a rotary input device (e.g., a wheel or gear) which drives at least one endless transmission member (such as a band, a belt or a chain) and has a circular (smooth or toothed) peripheral portion. The improved apparatus comprises a hollow torque transmitting element having a circular radially outer portion which can be provided with a toothed or a smooth surface. The at least one endless transmission member is trained over the outer portion of the torque transmitting element and the latter further comprises a circular (smooth or toothed) radially inner portion which is eccentric with reference to, which spacedly surrounds and which includes a part in rolling contact with, the peripheral portion of the rotary input device. The torque transmitting element is free to perform pendulum movements relative to the rotary input device about a roving or moving axis located at the aforementioned part of the radially inner portion of the torque transmitting element.

The at least one member is trained over the radially outer portion of the torque transmitting element under tensional stress so that the aforementioned part of the radially inner portion of the torque transmitting element is biased against the peripheral portion of the rotary input device. It is preferred to employ an elastic transmission member which yields in response to the application of tensional stresses.

The torque transmitting element is oscillatable relative to the rotary input device about the aforementioned roving or moving axis due to the elasticity of the at least one endless transmission member.

The apparatus can further comprise a prime mover for the rotary input device, and such prime mover can include or constitute an internal combustion engine, e.g., an engine for use in motor vehicles.

The input element can include or constitute a crankshaft or a camshaft of a combustion engine.

If the aforementioned endless transmission member is elastic, so that it yields in response to the application of tensional stresses. The apparatus can further comprise at least one driven rotary component (e.g., a pulley or sheave) which receives torque from the at least one endless transmission member. As already mentioned above, the input device can form part of, or can include, an internal combustion engine. The masses of the torque transmitting element and of the at least one rotary component are preferably related to the elasticity of the at least one elastic transmission member in such a way that that the apparatus has a characteristic frequency that is less than an idling RPM of the engine. The characteristic frequency can be less than a minimum RPM of the engine, namely that RPM below which the engine comes to a halt.

If the at least one endless transmission member is elastic so that it yields in response to the application of tensional stresses, the improved apparatus can further comprise at least one rotary driven component (such as a pulley or sheave which serves to transmit torque to a blower or fan, to a compressor, to a pump, to an alternator and/or to a power steering mechanism of a motor vehicle) which receives torque from the at least one endless transmission member.

The rotary input device of such apparatus can include or constitute an internal combustion engine and the radially inner portion of the hollow torque transmitting element in such apparatus has a radius which is smaller than the radius of the peripheral portion of the at least one rotary input device. The inertia of the torque transmitting element, the ratio of the aforementioned radii and the elasticity of the at least one endless transmission member in relation to the at least one component, is preferably such that the characteristic frequency of the apparatus is less than the aforementioned minimum RPM of the engine.

As mentioned above, the diameter of the peripheral portion of the rotary input device is less than the diameter of the radially inner portion of the torque transmitting element, and the ratio of the two diameters is or can be between 1.5:1 and 5:1.

In accordance with a presently preferred specific embodiment of the present invention, the torque transmitting element of the improved apparatus further comprises a second radially inner (toothed or smooth-surfaced) portion. The two radially inner portions of the torque transmitting element have a common axis of rotation and different diameters, and such apparatus can further comprise a second rotary input device having a second (toothed or smooth-surfaced) circular portion. The two peripheral portions have a common axis of rotation and the second radially inner portion is eccentric with reference to, spacedly surrounds and includes a part (e.g., a line) in rolling contact with the second peripheral portion.

The two input devices preferably have a common axis of rotation and the two peripheral surfaces have different diameters.

The just-described presently-preferred apparatus can further comprise a common shaft for the two rotary input devices. Such input shaft can be said to constitute a driver shaft which is coaxial with at least one of the two input devices, and the apparatus can further comprise a freewheel between the shaft and the at least one device.

An engageable and disengageable clutch (such as a friction clutch, e.g., a disc clutch) can be interposed between the shaft and one of the two rotary input devices. Such apparatus can further comprise a centrifugal mechanism for engaging and disengaging the clutch. The centrifugal mechanism (or another suitable engaging and disengaging mechanism for the clutch) can be designed in such a way that it engages the clutch within a first range of RPM of the one rotary input device and that it disengages the clutch within a higher second RPM of the one rotary input device. The centrifugal mechanism or an equivalent clutch engaging and disengaging mechanism can be designed in such a way that it disengages the clutch when the RPM of the one rotary input device is zero or close to zero.

The diameter of the peripheral portion of one of the two rotary input devices is larger than the diameter of the peripheral portion of the other rotary input device. The means for driving the two rotary input devices can comprise a rotary shaft (e.g., a camshaft or a crankshaft of an engine in a motor vehicle) and the apparatus can further comprise a clutch between the driving means and the one device as well as a freewheel between the driving means and the other device. The driving means can comprise a common shaft for the two devices.

The apparatus can comprise hydraulic actuating means for the clutch, and such actuating means can comprise a pump, e.g., a gear pump of the type known as a sickle pump or a crescent pump. In accordance with a presently preferred embodiment, the pump comprises an internal gear and a spur gear which is eccentric relative to, and mates with, the internal gear. The spur gear can form part of one of the two rotary input devices, namely of the device having a diameter greater than that of the other rotary input device. A substantially sickle-shaped member can be interposed between the spur gear and the internal gear of the pump. The axis of rotation of the sickle-shaped member preferably coincides with the axis of rotation of the internal gear of the pump.

The improved apparatus can further comprise a common housing for the two rotary input devices, for the hydraulic pump actuating means and for the aforementioned centrifugal mechanism which serves to engage and disengage the pump. The at least one endless flexible transmission member engages a grooved, toothed or smooth peripheral surface of the housing.

BRIEF DESCRIPTION OF THE DRAWINGS

The novel features which are considered as characteristic of the invention are set forth in particular in the appended claims. The improved vibration damping or absorbing apparatus itself, however, both as to its construction and its mode of operation, together with additional features and advantages thereof, will be best understood upon perusal of the following detailed description of certain presently preferred specific embodiments with reference to the accompanying drawings, wherein:

DESCRIPTION OF PREFERRED EMBODIMENTS

Figure 1:
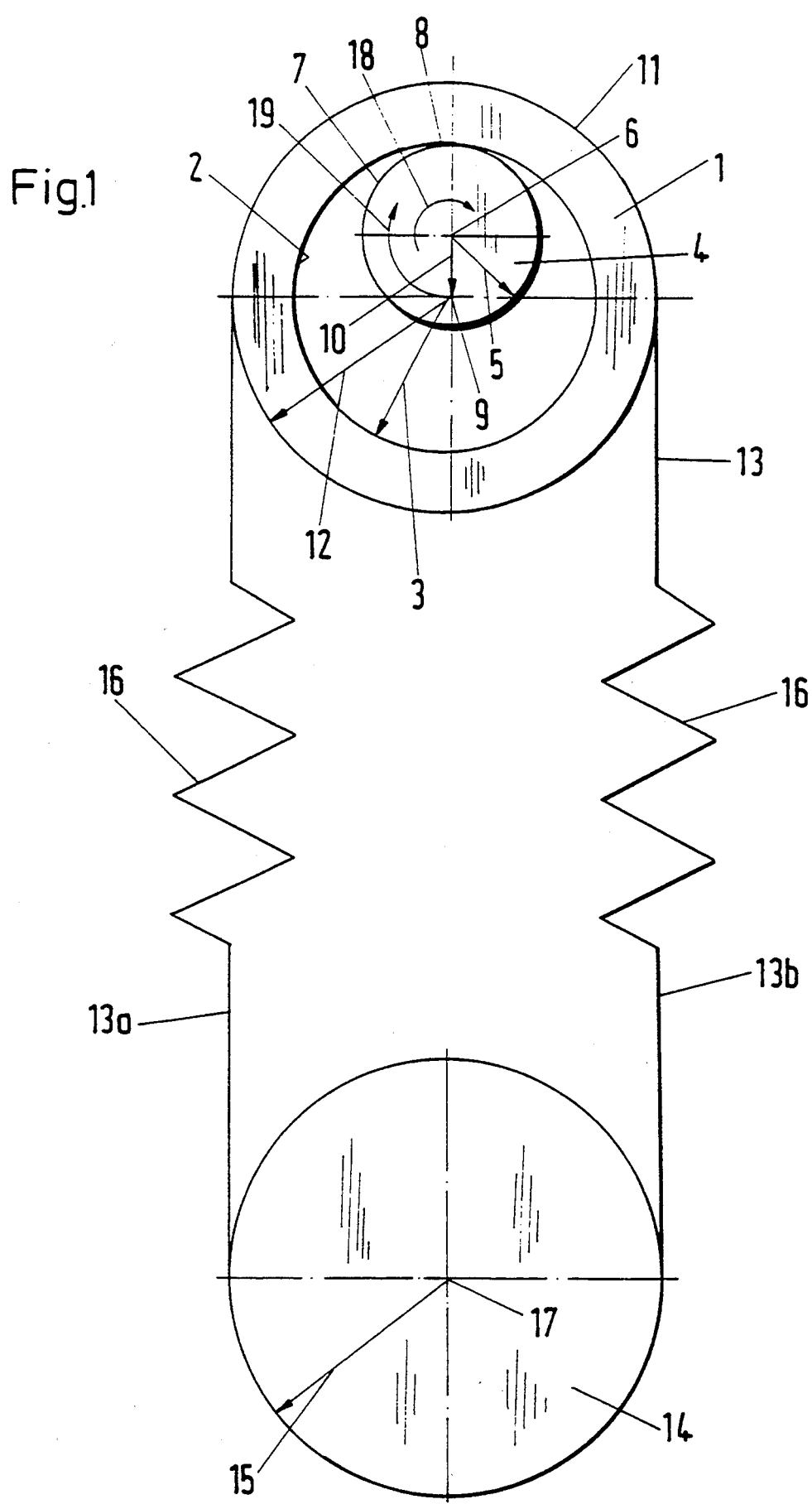
FIG. 1 is a schematic front elevational view of a vibration absorbing or damping apparatus which embodies the invention.

The vibration damping or absorbing apparatus which is shown in FIG. 1 comprises a composite first pulley or sheave including a rotary input device 4 (hereinafter called the "inner wheel" or "first wheel") and a hollow torque transmitting element 1 (hereinafter called the "second wheel" or "outer wheel"), a second pulley or sheave 14 forming part of, or driving, a rotary output component (such as an alternator, a compressor, a pump or a fan in a motor vehicle) and an endless flexible torque transmission member 13 (such as a belt, a band or chain and hereinafter called the "belt" for short). The radially inner portion of the outer wheel 1 has a cylindrical internal surface 2. A part 8 of the internal surface 2 is in contact with the cylindrical surface 7 of the peripheral portion of the inner wheel 4. The inner wheel 4 is rotatable about a fixed axis 6, e.g., an axis defined by a crankshaft or a camshaft (such as the shaft 225 shown in FIG. 4) of a prime mover, for example, an internal combustion engine of a motor vehicle. Reference may be had to U.S. Pat. No. 4,601,683 granted Jul. 12, 1986 to Foster for "Belt tensioner, part therefor and methods of making the same".

The radially outer portion of the outer wheel 1 has a cylindrical surface 11 which is engaged by the adjacent portion of the belt 13. The radius of the surface 2 is shown at 3, and the radius of the inner wheel 4 is shown at 5. The axis 9 of-the outer wheel can be termed a roving axis in that it can perform pendulum movements about an axis extending in parallelism with the axis 6 at the part 8 of contact between the cylindrical surfaces 2 and 7. The eccentricity of the internal surface 2 of the outer wheel 1 relative to the external surface 7 of the inner wheel 4 is sufficient to ensure that the outer wheel 1 can perform pendulum movements in and counter to the direction of arrow 19 when the inner wheel 4 is driven (e.g., by an internal combustion engine) in or counter to the direction of arrow 18. When the outer wheel 1 performs a pendulum movement relative to the inner wheel 4 about the aforementioned axis coinciding with the part 8 of the internal surface 2, the axis 9 of the outer wheel 1 moves along an arc having a radius 10 corresponding to the distance between the axis 9 and the axis 6. The part 8 of the internal surface 2 migrates along the external surface 7 of the inner wheel 4 when the outer wheel 1 performs a pendulum movement relative to the inner wheel.

The external surface 11 of the outer wheel 1 has a radius 12 corresponding to the radius of curvature of that looped portion or bight of the belt 13 which is trained over the wheel 1. The belt 13 is further trained over and transmits torque to the sheave 14 when the inner wheel 4 is driven by a prime mover to rotate the outer wheel 1.

Figure 2:
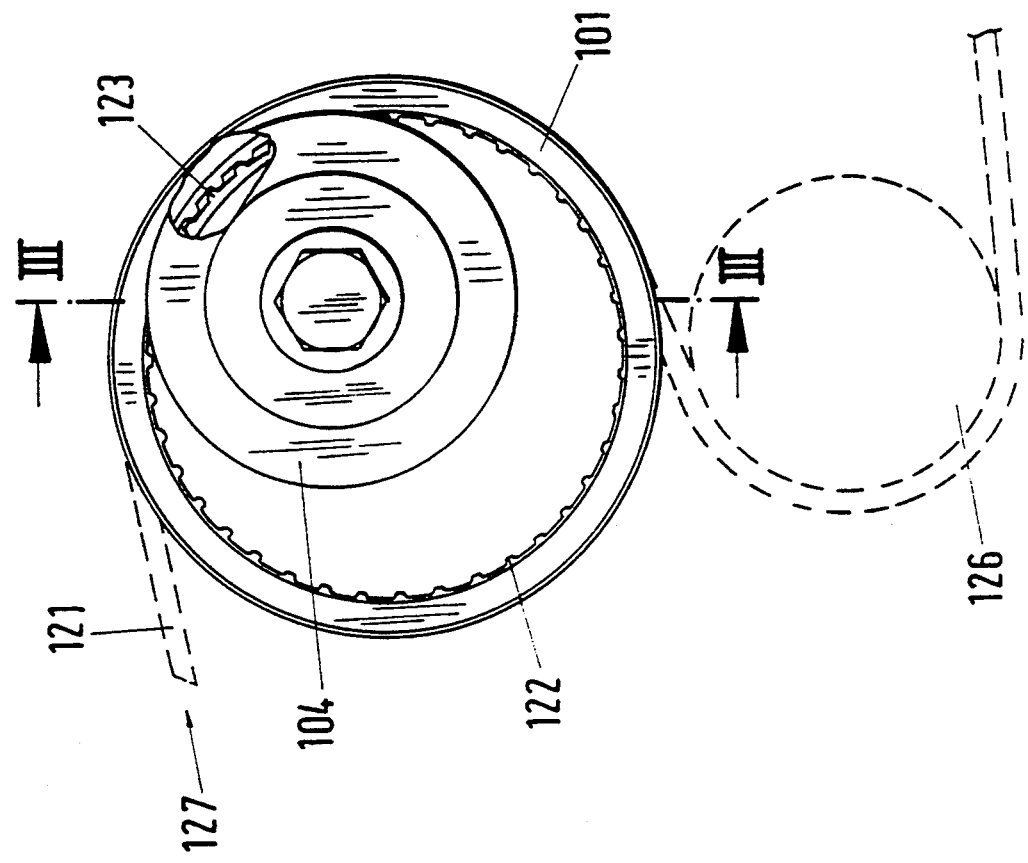
FIG. 2 is a fragmentary schematic view of a modified apparatus.

The transmission member 13 can be trained over two or more sheaves, e.g., in a manner as shown in FIGS. 1 and 2 of the aforementioned U.S. Pat. No. 4,601,683 to Foster. The sheave 14 is assumed to be rotatable about a fixed axis 17 and the radius of its peripheral surface is shown at 15. The radius 15 may, but need not, be identical with the radius 12 of the external or peripheral surface 11 of the outer wheel 4.

The transmission member 13 is elastic, i.e., it can yield to a certain extent in response to the application of tensional stresses. The elasticity of the two portions 13a, 13b which form part of the belt 13 and extend between the outer ring 1 and the sheave 14 is indicated at 16. The overall elasticity of the belt 13 is dependent primarily upon its spring gradient and upon the lengths of the portions 13a, 13b. The portion 13a can be called the tight side of the belt 13 when the outer wheel 1 is driven to rotate in the direction of the arrow 18, and the portion 13b then constitutes the so-called slack side of the belt.

When the apparatus of FIG. 1 is in actual use and the prime mover drives the inner wheel 4 in the direction of arrow 18 (so that the outer wheel 1 also rotates in the direction of the arrow 18), the two looped portions or bights of the transmission member 13 which are trained over the peripheral surface 11 of the outer wheel 1 and the peripheral surface of the sheave 14 are stretched less than the portions 13a, 13b between the wheel 4 and the sheave 14. Otherwise stated, it can be said that the elasticity of the two loops or bights of the transmission member 13 are less pronounced or less effective than that of the elongated portions 13a and 13b.

In the embodiment of FIG. 1, the external surface 7 of the peripheral portion of the inner wheel 4 is in mere frictional engagement with the surface 2 of the radially inner portion of the outer wheel 1. However, it is equally possible (and often preferred) to provide the internal surface 2 with teeth which mate with teeth at the surface 7 of the inner wheel 4. The latter can constitute a spur gear and the outer wheel 1 can constitute an internal gear having one or more teeth in mesh with one or more teeth of the inner wheel 4 at the part 8 of the internal surface 2.

The upper bight or loop of the endless flexible belt 13 can be in mere frictional engagement with the external surface 11 of the radially outer portion of the outer wheel 1. The same applies for the lower bight or loop of the member 13 and the external surface of the sheave 14. However, it is equally possible to employ an internally toothed belt 13 and to provide the external surface 11 of the outer wheel 1 and/or the external surface of the shave 14 with teeth which mate with the adjacent teeth of the belt 13. It is further possible to provide the external surface 11 of the outer wheel 1 with one or more circumferentially extending grooves and to employ a V-belt in order to enlarge the area of frictional engagement between such belt on the one hand and the outer wheel 1 and sheave 14 on the other hand.

The part 8 of the internal surface 2 of the outer wheel 1 is biased into requisite frictional engagement with the adjacent portion of the external surface 7 of the inner wheel 4 by the elastic belt 13. It is preferred to install the belt 13 in stressed condition so that its bias upon the wheel 1 suffices to ensure adequate frictional engagement between the surfaces 2, 7 as well as between the belt 13 and the external surface of the sheave 14.

When the inner wheel 4 is driven by a prime mover, such as by the internal combustion engine of a motor vehicle, the ratio of the RPM of the wheel 4 to the RPM of the outer wheel 1 is the same as the ratio of the radii 3 and 5, i.e., the RPM of the outer wheel 1 is lower than that of the inner wheel 4. Thus, the wheels 4 and 1 constitute a step-down transmission which cooperates with the elastic belt 13 to constitute an apparatus which damps or absorbs vibrations of the output shaft of the prime mover so that such vibrations are not transmitted to the component (e.g., an alternator, a compressor, a pump or a fan) which receives torque from the sheave 14.

As already mentioned above, the elastic belt 13 can be trained around two or more sheaves or pulleys to drive two or more rotary devices under the hood of a motor vehicle. The outer wheel 1 cooperates with the belt 13 to prevent the transmission of vibratory movements from the inner wheel 4 (i.e., from the output element of an engine or another prime mover) to the component or components which are driven by the belt 13. The necessary spring gradient of the vibration damping or absorbing apparatus is determined by the selected elasticity of the belt 13. The elasticity of the belt 13 should not be excessive because this belt must transmit a certain torque from the inner wheel 4 to one or more rotary components, i.e., to one or more sheaves each of which can serve to drive a discrete rotary component or two or more rotary components. In view of the just mentioned need for a belt whose elasticity is not excessive, the damping or absorption of vibratory movements of the prime mover which drives the inner wheel 4 is preferably counteracted by the belt 13 in conjunction with the wheels 1 and 4. Thus, the wheels 1 and 4 cooperate to transform or convert the damping action of changes of the length of the belt 13 which develop in response to torsional vibrations of the prime mover for the wheel 4 in such away that relatively small or minor changes in the length of the elastic belt 13 entail pronounced pendulum movements of the outer wheel 1 relative to the inner wheel 4. The extent (angle) of pendulum movement of the outer wheel 1 relative to the inner wheel 4 is dependent upon the ratio of the radius 3 of the internal surface 2 of the wheel 1 to the radius 5 of the external surface 7 of the wheel 4. Otherwise stated, the extent of pendulum movement of the outer wheel 1 is a function of the ratio of the diameter of the internal surface 2 to the diameter of the external surface 7.

When the torque which is being transmitted to the inner wheel 4 fluctuates, i.e., when the torsional vibrations which are being applied to the apparatus of FIG. 1 entail changes in the length of the belt 13, the axis 9 of the outer wheel 1 moves relative to the fixed axis 6 of the inner wheel 4 in that the axis 9 moves along a circular path having the radius 10. The radius 10 is indicative of the eccentricity of the axes 6 and 9 relative to each other. The ability of the outer wheel 1 to perform pendulum movements relative to the inner wheel 4 ensures that the wheel 1 can act not unlike a vibration damper or a floating mass. The part 8 of the internal surface 2 of the outer wheel 1 migrates along the external surface 7 of the inner wheel 4 when the wheel 1 performs its pendulum movements. The exact locus of the part 8 is in the plane which includes the fixed axis 6 of the inner wheel 4 and the axis 9 of the outer wheel 1. As already mentioned above, the part 8 moves along the external surface 7 of the inner wheel 4 to an extent and in a direction determined by the extent and direction of pendulum movements of the outer wheel 1.

The tight side 13a of the belt 13 is tensioned in automatic response to the transmission of torque from the inner wheel 4 to the outer wheel 1. In other words, the side 13a is lengthened when the inner wheel 4 is driven in the direction of the arrow 18 and the thus tightened belt 13 opposes the pendulum movement of the outer wheel 1 relative to the inner wheel 4. As can be seen in FIG. 1, the distance of the axis 9 of the outer wheel 1 from the fixed axis 17 of the sheave 14 increases when the wheel 1 performs its pendulum movements relative to the inner wheel 4 because the wheel 1 then leaves the neutral position (with reference to the wheel 4) which is shown in FIG. 1. If the inner wheel 4 is driven to rotate in the direction of the arrow 18, the axis 9 of the outer wheel 1 moves along an arcuate path denoted by the arc 19 which moves the axis 9 of the wheel 1 further away from the axis 17 of the sheave 14. The part or line 8 of contact between the surfaces 2 and 7 then moves in the direction of the arrow 19, i.e., the wheel 1 rolls relative to the wheel 4 in a clockwise direction so that the tight side 13a of the belt 13 expands and the stress upon the slack side 13b of the belt 13 is relaxed. In other words, the side 13a can be said to become longer and the side 13b can be said to become shorter. This, in turn, causes the outer wheel 1 to perform pendulum movements relative to the inner wheel 4 about the axis which is parallel to the axes 6 and 9 and is located at the part 8 of contact between the surfaces 2 and 7. The radius of the arcuate path of the axis 9 of the outer wheel 1 when the wheel 1 performs pendulum movements relative to the wheel 4 is shown at 10. Due to the kinematics of the illustrated vibration absorbing or damping apparatus, even minor changes of the length of the belt 13 (i.e., even minor stretching of the belt) can effect relatively large pendulum movements (angular displacements) of the outer wheel 1 relative to the inner wheel 4.

Figure 3:
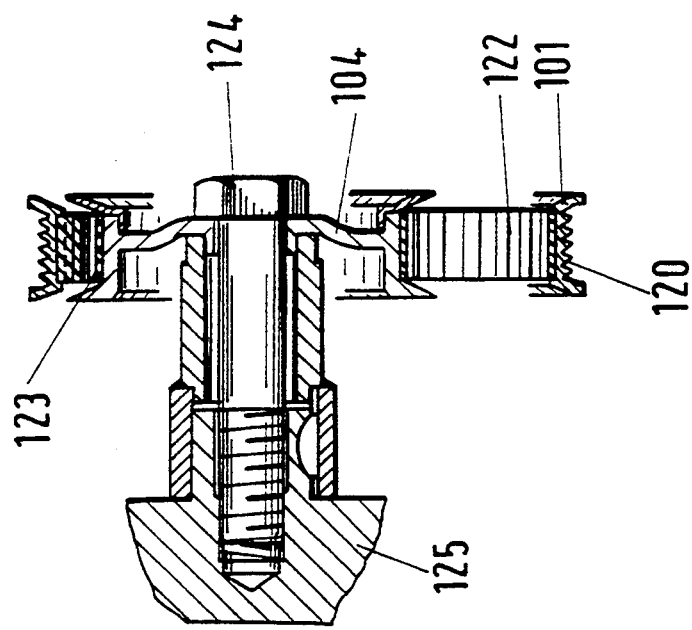
FIG. 3 is a fragmentary sectional view substantially as seen in the direction of arrows from the line III—III in FIG. 2.

FIGS. 2 and 3 illustrate a portion of a modified vibration absorbing or damping apparatus wherein the outer wheel 101 has an external or peripheral surface provided with a number of circumferentially extending grooves 120 for the complementary ribs at the inner side of an endless elastic flexible torque transmitting member 1 21 (e.g., a poly-V-belt). The internal surface of the outer wheel 101 is provided with an annulus of gear teeth 122 which mate with the external teeth 123 of the inner wheel 104. The teeth 122 and 123 ensure that the outer wheel 101 can roll along the toothed external surface of the inner wheel 104 without any slippage, to thus ensure predictable transmission of torque from the prime mover (e.g., an engine) which drives the inner wheel 104 to one or more sheaves or pulleys (not shown) which are driven by the belt 121.

FIG. 3 shows that the internal teeth 122 are formed on a relatively thin endless flexible web of rubber or elastomeric plastic material which is glued or otherwise reliably affixed to the cylindrical external surface of the outer wheel 101. Analogously, the teeth 123 are or can be provided on an endless flexible web of rubber or elastomeric plastic material which is bonded or otherwise affixed to the cylindrical external surface of the first wheel or inner wheel 104. It is further possible to vulcanize or otherwise bond discrete teeth 122 to the internal surface of the outer wheel 101 and/or to vulcanize or otherwise bond discrete teeth 123 to the external surface of the inner wheel 104.

An advantage of the apparatus which is shown in FIGS. 2 and 3 is that the making of at least one of the two sets of teeth 122, 123 from an elastomeric material (such as rubber or a synthetic plastic substance) contributes to significant reduction of noise when the apparatus is in use to transmit torque from the inner wheel 104 to one or more pulleys which are driven by the endless flexible transmission member 121.

The central portion or hub of the inner wheel 104 is non-rotatably affixed to an output element 125 (e.g., a camshaft or a crankshaft) of a combustion engine by a threaded fastener 124. Another threaded fastener or a fastener without threads can be used with similar advantage.

The reference character 126 denotes in FIG. 2 a rotary belt tensioner which engages a slack side of the belt 121 (it being assumed here that the outer wheel 101 is driven by the inner wheel 104 to advance the belt 121 in the direction of arrow 127). Thus, the tensioner 126 engages the belt 121 downstream of the composite pulley or sheave including the wheels 101 and 104 when the belt is driven in the direction of the arrow 127. In other words, the slack side of the belt 121 which is engaged by the tensioner 126 is not subject to increased tensional stresses when the apparatus of FIGS. 2 and 3 is in actual use to advance the belt 121 in the direction of the arrow 127. Belt tensioners which can be utilized in conjunction with the belt 121 of FIGS. 2 and 3 are disclosed, for example, in the published German patent application No. 38 12 375 and in the published UK patent application No. 2 233 063. The elasticity or the spring gradient of the belt 13 or 121 and the mass moment of inertia of the second wheel 1 or 1 01 with reference to the overall vibratory system including the component or components receiving torque from the belt 21 or 121 and the prime mover which drives the inner wheel 4 or 104 should be selected in such a way that, when the prime mover is in the process of transmitting torque to the inner wheel 4 or 104, the system operates within the supercritical RPM range. This means that no resonance develops during normal operation of the engine, motor or another prime mover serving to rotate the wheel 4 or 104. It is presently preferred to select the critical RPM range or resonance range in such a way that it is below the lowest RPM at which the prime mover is being operated or can be operated. This can be readily accomplished by appropriate design of the endless flexible belt 13 or 121 and of the outer wheel 1 or 101. If the prime mover is a combustion engine, the characteristic frequency of the overall system is preferably below the idling RPM of the engine and most preferably below the natural frequency RPM of the engine. The natural frequency RPM is the lowest RPM at which the engine can operate on its own. Such RPM is normally in the range of between 150 and 300 RPM. It is of particular advantage if the overall system is designed in such a way that the critical RPM is below the maximum RPM at which the engine can be driven by a starter; this ensures that the starter automatically causes the engine to increase its RPM above the critical RPM range, i.e., that no resonance can develop in the system.

Additional parameters which warrant consideration in connection with the selection of the elastic and damping characteristics of the belt 13 or 121 and the mass moment of inertia of the outer wheel 1 or 101, because they influence the characteristic frequency of the vibratory system, include the moment of inertia of the component or components to be driven by the belt, the transmission ratio between the inner wheel 4 or 104 and the outer wheel 1 or 101, as well as the radii of curvature of the loops of the belt 13 or 121 which develop due to the fact that the belt is trained over the outer wheel 1 or 101 and the sheave or sheaves (such as the sheave 14 of FIG. 1) serving to transmit torque to one or more driven components. Proper selection of the aforediscussed parameters ensures that the tensional stress upon the belt 13 or 121 is proportional (i.e., it conforms) to the torque which the belt can transmit to the driven component or components. As mentioned above, the driven component or components can include an alternator, a pump, a blower or fan and/or a compressor if the improved torque absorbing or damping apparatus is driven by the combustion engine of a motor vehicle.

Figure 4:
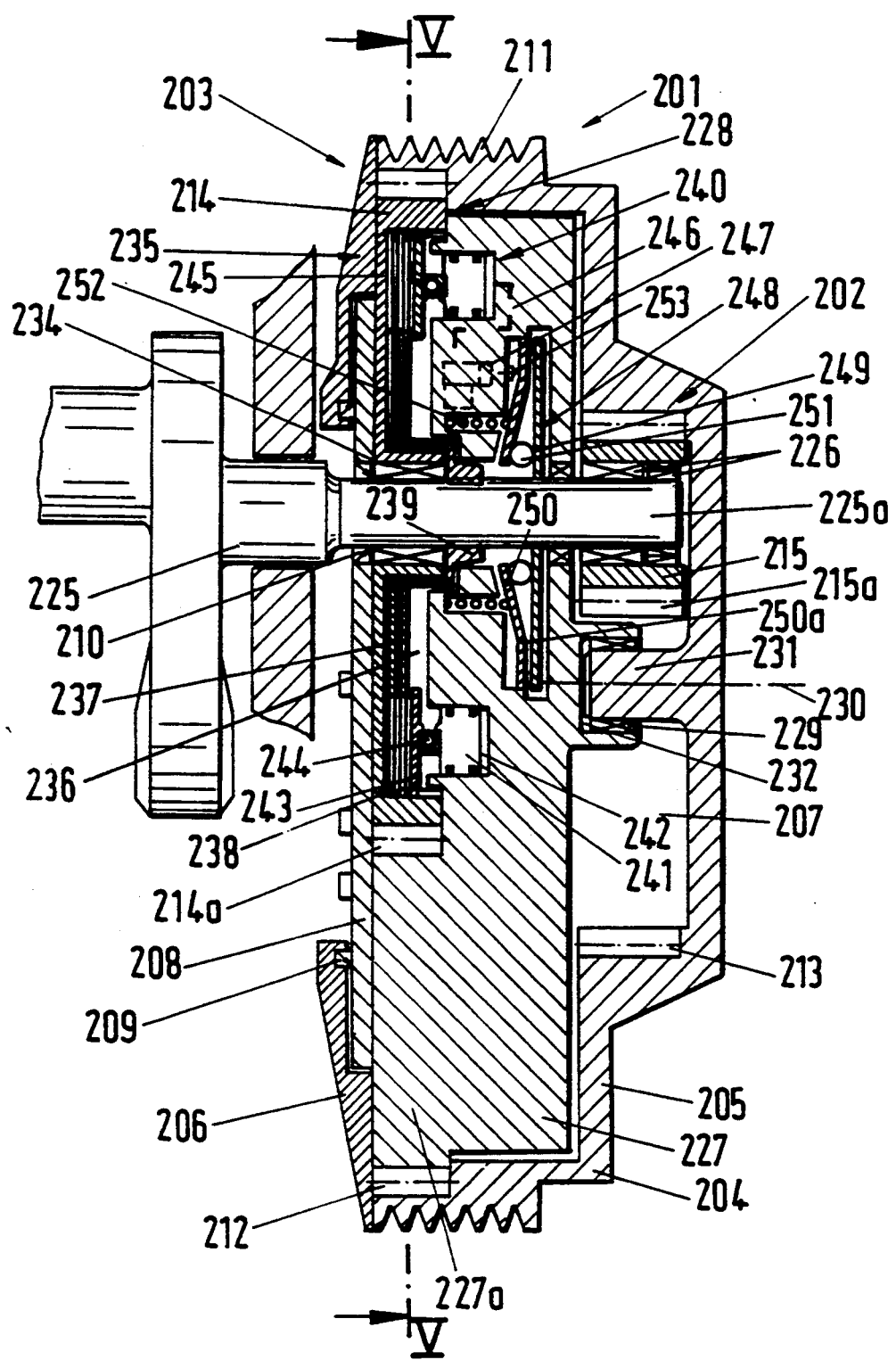
FIG. 4 is a central sectional view of a third apparatus which, in addition to serving as a means for absorbing or damping vibrations, can also perform the function of a multi-speed transmission; and o
Figure 5:
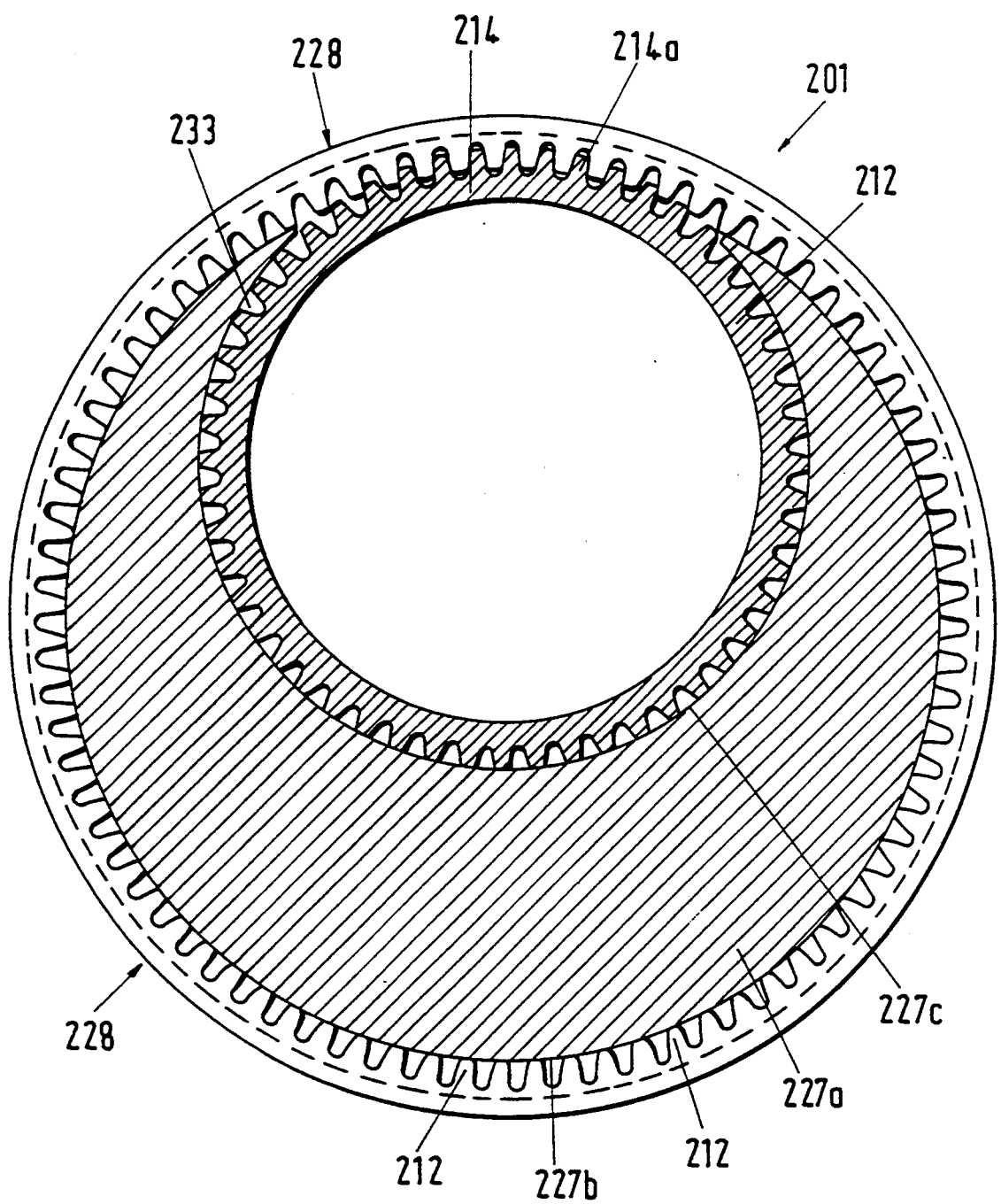
FIG. 5 is a sectional view of certain parts of the third apparatus substantially as seen in the direction of arrows from the line V—V in FIG. 4.

FIGS. 4 and 5 illustrate a third embodiment of the improved vibration absorbing or damping apparatus 201 which includes the aforementioned shaft 225 forming part of or constituting the camshaft or the crankshaft of a combustion engine for use in a motor vehicle. The apparatus 201 serves as a transmission having two different speed ratios 202 and 203. The housing 204 of the apparatus 201 includes a cupped main section 205 having an open side confronting the engine and being partly closed by a washer-like second section or cover 206. The latter extends radially inwardly from the free end of the cylindrical portion of the main section 205 to at least partially seal the internal space 207 of the housing 204 from the surrounding atmosphere. The space 207 is further sealed by a second washer-like section 208 which can rotate relative to and whose radially outer portion is overlapped by the radially inner portion of the cover 206. The means for sealing the space 207 from the atmosphere further comprises a first sealing element (e.g., an O-ring) 209 between the overlapping portions of the housing sections 206, 208 and a second sealing element (e.g., an O-ring) 210 which is installed between the radially inner portion of the section 208 and a coaxial extension or stub 225a of the shaft 225. The stub 225a is or can be of one piece with the shaft 225.

The housing 204 performs the function of the outer wheel 1 or 101 and the external surface of its cylindrical radially outer portion is profiled at 211 (the illustrated housing 204 is provided with a set of circumferentially extending grooves) to receive complementary ribs at the inner side of an endless flexible elastic transmission member (not shown), such as a V-belt corresponding to the belt 121 which is shown in FIG. 2. The belt can drive one or more sheaves corresponding to the sheave 14 of FIG. 1, i.e., it can drive one or more rotary components under the hood of a motor vehicle.

The main section 205 of the housing 204 further comprises two annuli of internal teeth 212, 213 constituting two coaxial internal gears. The diameter of the internal gear including the teeth 212 is larger than the diameter of the internal gear including the teeth 213. The internal gear including the teeth 212 mates with a spur gear 214, and the internal gear including the teeth 213 mates with a second spur gear 215. The diameters of the two internal gears and of the respective spur gears are selected in such a way that the step-down transmission ratio of the gearing including the teeth 213 and the spur gear 215 is greater than the step-down ratio of the gearing including the teeth 212 and the spur gear 214. Thus, when the belt which is trained over the externally profiled portion 211 of the main section 205 of the housing 204 is driven by the spur gear 215, the rotational speed of the profiled portion 211 is less than if the portion 211 of the main housing section 205 is driven by the spur gear 214. The difference between the ratios 202 and 203 corresponds to the relationship between the pitch circle diameters of the internal gear including the teeth 23 and the spur gear 215 including the teeth 215a, and the pitch circle diameters of the internal gear including the teeth 212 and the teeth 214a of the spur gear 214.

A freewheel 226 is interposed between the spur gear 215 and the stub 225a of the shaft 225. The freewheel 226 operates in such a way that, when the shaft 225 is driven by the engine, the freewheel transmits torque from the stub 225a to the spur gear 215 so that the latter can rotate the housing 204. If the RPM of housing 204 exceeds the RPM of the shaft 225 due to the ratio of the gearing including the teeth 213 and 215a, the freewheel 226 ceases to transmit torque from the stub 225a to the housing 204.

As can be seen in FIG. 5, the spur gear 214 and the internal gear including the teeth 212 of the main housing section 205 cooperate with a sickle-shaped portion 227a of a washer-like intermediate member 227 to constitute a gear pump 228 (also called sickle pump or crescent pump). FIG. 4 shows that the member 227 including the sickle-shaped portion 227a further includes a hub surrounding a bearing 229 (e.g., an antifriction bearing) which, in turn, surrounds a stub 231 at the inner side of the bottom wall or end wall of the main housing section 205. The axis 230 of the stub 231 and bearing 229 coincides with the axis of the member 227, i.e., with the common axis of the internal gears including the teeth 212 and 213. The free end of the stub 231 extends into a complementary socket 232 which is provided in the member 227 and further receives the bearing 229. In lieu of utilizing the antifriction bearing 229, it is also possible to employ a friction bearing. Furthermore, it is even possible to omit a discrete bearing and to have the cylindrical external surface 227b in sliding contact with the internal teeth 212 and/or the cylindrical internal surface 227c in sliding contact with the teeth 214a of the spur gear 214. This suffices, at least in certain instances, to properly locate the member 227 in the main section 205 of the housing 204.

The sickle-shaped portion 227a of the member 227 is provided with a recess 233 which is bounded by the surface 227c and accommodates the spur gear 214. The latter is mounted on a bearing 234 which surrounds the stub 225a of the shaft 225. A friction clutch 235 is provided to establish or terminate a torque transmitting connection between the shaft 225 and the gear 214.

The illustrated clutch 235 is a disc clutch which is confined in an axially extending central circular passage 236 of the spur gear 214. This clutch comprises a set of torque transmitting discs 237 and a set of torque receiving discs 238. The discs 238 are non-rotatably but axially movably installed in the passage 236 of the gear 214. For example, one can provide a form-locking connection between the gear 214 and the driven discs 238 of the clutch 235, and the discs 238 have a limited freedom of axial movement in the passage 236. The stub 225a of the shaft 225 is non-rotatably connected with a hub 239 which, in turn, is non-rotatably connected with the discs 237 (e.g., by a form locking-connection) in such a way that the discs 237 have at least some freedom of axial movement relative to the stub 225a.

The clutch 235 can be engaged by a hydraulic actuating unit 240 having an annular piston 241 reciprocable in a cylinder chamber 242 defined by the member 227. A disengaging bearing 244 is installed between the piston 241 of the unit 240 and a washer-like pressure plate 243. The discs 237, 238 alternate with each other in the axial direction of the stub 225a and can be clamped against each other between the axially movable pressure plate 243 and a flange 245 which is adjacent the inner side of the section 208 of the housing 204. The section 208 cannot rotate relative to the member 227 and/or vice versa.

The cylinder chamber 242 of the unit 240 can receive a pressurized hydraulic fluid from the pressure side of the pump 228 by way of a conduit 246. The latter contains a valve 247 which can permit or prevent the flow of pressurized hydraulic fluid from the pump 228 into the cylinder chamber 242. A centrifugal mechanism 248 is provided to operate the valve 247, i.e., to control the admission of pressurized fluid into the cylinder chamber 242. The illustrated centrifugal mechanism 248 comprises a first washer 249 which is non-rotatably mounted on the stub 225a and a second washer 250 which is movable away from the washer 249 against the opposition of a coil spring 252 which reacts against an internal shoulder of the member 227. The washer 250 is non-rotatably coupled with the member 227, i.e., with the spur gear 214. A set of spherical weights 251 is interposed between the washers 249 and 250 to bear against the washer 249 under the bias of the spring 252 (by way of the washer 250). The washer 250 cooperates with an actuating element 253 for the valve 247, i.e., the element 253 determines whether or not the valve 247 permits pressurized fluid to flow from the pressure side of the pump 228, through the conduit 246 and into the cylinder chamber 242 of the unit 240.

The operation of the apparatus 201 is as follows:

When the prime mover is started to rotate the shaft 225 and its stub 225a, the friction clutch 235 is disengaged because the pump 228 is yet to pressurize the hydraulic fluid. As the shaft 225 rotates during acceleration of the prime mover, the housing 204 is rotated by the stub 225a and freewheel 226 at the lower speed ratio 202. The rotating housing 204 drives the gear 214 to thus actuate the gear pump 228 which admits pressurized fluid into the conduit 246 so that the pressurized fluid enters the cylinder chamber 242 because the valve 247 is open. The mounting of the valve 247 is such that, unless actuated by the element 253, it permits pressurized fluid to flow from the pump 228 into the chamber 242. The fluid which flows into the chamber 242 moves the piston 241 in a direction to engage the friction clutch 235, i.e., the neighboring discs 237,238 gradually engage each other so that the clutch 235 is engaged and can transmit torque from the stub 225a directly to the spur gear 214. The clutch 235 is engaged in that the package of discs 237, 238 is compressed between the pressure plate 243 and the flange 245. Thus, when the clutch 235 is engaged, the spur gear 214 is driven by and rotates at the RPM of the shaft 225.

Since the speed ratio 203 is higher than the speed ratio 202, the engagement phase of the friction clutch 235 involves an acceleration of the housing 204 as well as of its profiled portion 211 from the speed corresponding to the ratio 202 to that corresponding to the ratio 203. This causes the freewheel 226 to operate in such a way that the spur gear 215 rotates at a speed which is higher than that of the shaft 225 and its stub 225a. In other words, the RPM of the spur gear 215 exceeds the RPM of the shaft 225.

As the RPM of the shaft 225 increases, the centrifugal mechanism 248 becomes effective because the centrifugal force causes the spherical weights 251 to move radially outwardly along the conical or wedge-like sloping surfaces 250a of the washer 250. This causes the washer 250 to move axially against the opposition of the coil spring 252 so that the actuating element 253 is moved in a sense to cause the valve 247 to interrupt the flow of pressurized hydraulic fluid from the pump 228 into the chamber 242 of the cylinder and piston unit 240. The pressure in the cylinder chamber 242 drops (e.g., because he valve 247 opens a path for the flow of fluid from the chamber 242 to a sump) and the clutch 235 becomes disengaged. Such disengagement of the clutch 235 entails that the housing 204 is again driven by way of the freewheel 226 so that its RPM matches that of the stub 225a of the shaft 225, i.e., the speed ratio 202 determines the RPM of the housing 204 and its grooved peripheral portion 211. In order to ensure that the speed ratio 202 controls, it is necessary to guarantee that the centrifugal mechanism 248 be non-rotatably connected to the stub 225a of the shaft 225, i.e., that the RPM of the centrifugal mechanism 248 is preferably proportional to the RPM of the shaft 225.

The centrifugal mechanism 248 of the apparatus 201 which is shown in FIGS. 4 and 5 ensures gradual actuation of the valve 247. However, it is also possible to modify the centrifugal mechanism 248 (or to replace the mechanism 248 with a different centrifugal mechanism) in order to ensure rapid and even abrupt or practically instantaneous actuation of the valve 247 and hence also of the friction clutch 235. Such undertaking ensures that the friction clutch 235 is engaged and/or disengaged when the RPM of the shaft 225 matches or at least approximates a predetermined RPM. For example, the washer 249 and/or the washer 250 can be provided with recesses in the form of channels or analogous formations which can at least partially receive the spherical weights 251. The configuration of the surfaces bounding the recesses in the washer 249 and/or in the washer 250 can be such that the centrifugal force acting upon the weights 251 at a selected RPM or at a selected range of RPM of the shaft 225 and its stub 225a reaches a value at which the retaining force exerted upon the spherical weights 251 is abruptly overcome, i.e., that the spherical weights 251 can leave the respective recesses and move radially outwardly therefrom at a reasonably high speed. As the RPM decreases, the magnitude of the centrifugal force acting upon the spherical weights 251 also decreases and the spring 252 is then free to cause the weights 251 to reenter their respective recesses in the washer 249 and/or 250, i.e., the spring 252 moves the weights 251 radially inwardly. This causes abrupt reopening of the valve 247.

The housing 204 is free to perform pendulum movements relative to the spur gears 214 and 215 in a manner as already described with reference to the outer or second wheel 1 in the 20 apparatus of FIG. 1. Pendulum movements of the housing 204 involve a rolling movement of the teeth 212, 213 of the housing 204 relative to the respective spur gears 214, 215.

The apparatus 201 of FIGS. 4 and 5 operates in such a way that the component or components (such as a compressor, 25 an alternator, a fan and/or a pump) which are driven by a belt trained over the profiled portion 211 of the housing 204 can rotate at a high RPM when the RPM of the shaft 225 is relatively low (because the chosen speed ratio is the ratio 203). On the other hand, when the RPM of the shaft 225 increases, the lower speed ratio 202 prevails so that the component or components receiving torque from the housing 204 by way of one or more endless flexible elastic belts or the like are driven at a reduced speed. Thus, the component or components receiving torque from the housing 204 are operated in a most economical way, i.e., their rotational speed always corresponds to a particular (optimum) RPM of the shaft 225.

The apparatus of FIGS. 4 and 5 can be said to embody two apparatus of the type shown schematically in FIG. 1. The two apparatus of the type shown in FIG. 1 are connected in parallel and operate with different diameters, i.e., with different transmission ratios. If the housing (pulley or sheave) 204 is to be rotated at a lower speed, the friction clutch 235 is disengaged and the housing 204 is then rotated by the freewheel 226, i.e., by the smaller-diameter spur gear 215. If the clutch 235 is engaged, the housing 204 is driven by the spur gear 214, i.e., the freewheel 226 does not transmit torque because the housing 204 is driven at an RPM higher than that of the gear 215. The clutch 235 of the apparatus 201 which is shown in FIGS. 4 and 5 is operated by the hydraulic cylinder and piston unit 240. However, it is equally within the purview of the invention to operate the friction clutch 235 pneumatically or mechanically or electrically when necessary.

The drawings merely show a few presently preferred embodiments of the improved vibration absorbing or damping apparatus. The illustrated apparatus can be modified in a number of different ways without departing from the spirit of the invention. For example, the invention can be embodied in all or practically all types of apparatus wherein a mass serving as a pulley or sheave for one or more endless flexible torque transmission members in the form of belts, bands, chains or the like is eccentrically mounted on a rotary driving member to perform pendulum movements in response to changes in the tensional stress upon the tight side or sides of the endless torque transmission member or members. Furthermore, the features of the apparatus of FIG. 1 can be combined or used interchangeably with those of the apparatus of FIGS. 2 and 3 and/or with those of the apparatus of FIGS. 4 and 5. Still further, the features of the illustrated apparatus can be utilized in combination with those disclosed in the aforementioned prior publications.

An important advantage which is shared by all of the illustrated embodiments of the improved vibration damping or absorbing apparatus is that the hollow torque transmitting element 1, 101, 212 or 213 has an inner diameter larger than the outer diameter of the respective rotary input device 4, 104, 214 or 215 so that the torque transmitting element can perform pendulum movements relative to the respective rotary input device, whereby the axis of the torque transmitting element moves along an arcuate (circular) path. The endless transmission member (such as 13 or 121) exhibits the elasticity which is required to ensure that the driven component or components (such as the pulley or sheave 14 and the machine or machines receiving torque from such driven component or components) are effectively insulated against vibratory movements which are being carried out by the corresponding rotary input device. Otherwise stated, the elasticity of the endless transmission member is or can be utilized to produce the required spring gradient. As already mentioned above, the endless transmission member (such as the member 13 of FIG. 1, the member 121 of FIG. 2 and the member (not shown) which is trained over the profiled external surface 211 of the housing 204 shown in FIG. 4) can constitute an endless chain or an endless belt or band, such as a flat belt, a V-belt, a belt having a plurality of longitudinally extending internal grooves, an internally toothed belt or any other suitable endless belt exhibiting the required elasticity. The belt or belts can be made of rubber or a suitable synthetic plastic material. Furthermore, each belt can be reinforced by filaments or in any other suitable way. It is presently preferred to employ one or more heavy-duty endless transmission elements which have a high tensile strength and can stand repeated gradual or abrupt application of very pronounced tensional stresses such as those which are likely to, or which, can arise when the endless transmission member is used under the hood of a motor vehicle to drive an alternator, a steering wheel drive, a compressor, a pump and/or a fan or blower.

As a rule, an endless belt or another endless transmission member which exhibits the just outlined desirable high tensile strength is incapable of properly insulating the driven component or components from vibratory movements which are caused by a combustion engine and are transmitted to the rotary input device or devices, such as the rotary input device 4 shown in FIG. 1. The reason is that the stretchability of such an endless transmission member is insufficient to compensate for vibratory or other stray movements of the rotary input device. However, if the endless transmission member having a high tensile strength is trained over a composite pulley (such as the pulley including the wheels 1 and 4 shown in FIG. 1) which embodies the present invention, even minor or minute changes of effective length of the endless transmission member are converted into pronounced pendulum movements of the hollow torque transmitting element relative to the respective rotary input device, namely into pendulum movements which enable the improved composite pulley to insulate the driven component or components from the vibratory movements of the rotary input device.

The elasticity of the endless transmission member and certain other parameters of the improved apparatus can be readily selected in such a way that the driven component or components are totally or practically totally insulated from undesirable stray movements of the prime mover, such as an internal combustion engine in a motor vehicle. The additional parameters which warrant consideration include the number of the torque receiving components which are driven by pulleys or sheaves (such as the sheave 14 of FIG. 1) receiving torque from the endless transmission member, the mass moment(s) of inertia of the driven component or components, the length of the tight and slack sides of the endless transmission member, the manner in which the looped portions of the endless transmission member transmit torque to the driven pulley or pulleys and/or in which the endless transmission member receives motion from the (smooth, toothed, grooved and/or otherwise configured) external surface of the hollow torque transmitting element, the length of those looped portions of a belt or chain which are trained over the hollow torque transmitting element and over the driven pulley or pulleys, the transmission ratio between a rotary input device and the associated hollow torque transmitting element, the eccentricity of the axes of the rotary input device and the hollow torque transmitting element relative to each other and the spring gradient (damping characteristics) of the endless transmission member.

A combustion engine of the character normally used in a motor vehicle inherently causes its rotary output element (such as a crankshaft or a camshaft) to carry out certain vibratory or analogous stray movements which should not be transmitted to the pulley or pulleys serving to rotate the input element(s) of one or more accessories under the hood of the vehicle. The amplitude and frequency of the stray movements depends upon the RPM of the engine. Therefore, it is desirable to select the characteristic frequency of the improved apparatus, and more particularly the characteristic frequency of the system including a hollow torque transmitting element (such as the outer or second wheel 1 in the apparatus of FIG. 1 ), the endless transmission member (such as the belt 13) and each driven component (including the pulley or sheave 14 in the apparatus of FIG. 1 and the auxiliary equipment driven by the sheave or sheaves), in such a way that it is below the idling RPM of the engine. This is achieved in the aforementioned manner by properly selecting the elasticity of the endless transmission member and certain other parameters of the improved apparatus.

The amplitude and frequency of stray movements which the hollow transmission element of the improved apparatus transmits to the endless transmission member further depends on the ratio of the radii (such as 3 and 5) of the rotary input device (such as 4) and the hollow torque transmitting element (such as 1). The amplitude and frequency of such stray movements can be minimized (i.e., maintained within acceptable limits) by the provision of the improved apparatus which can be built into existing vehicles or into other belt or chain drives in addition to its utilization in new vehicles or new belt or chain drives. Moreover, the improved apparatus can be readily designed in such a way that the transmission of torque from one or more rotary input devices to an endless flexible belt or chain entails the generation of minimal noise.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for absorbing vibrations of a rotary input device which drives at least one endless transmission member and has a circular peripheral portion, comprising:
   a hollow torque transmitting element having a circular radially outer portion, said at least one member being trained over said outer portion;
   said element further having a circular radially inner portion eccentric with reference to, spacedly surrounding and including a part in rolling contact with said peripheral portion; and
   said element being free to perform pendulum movements relative to said device about a roving axis at said part of said inner portion.

2. The apparatus of claim 1, wherein said at least one member is trained over said radially outer portion of said element under tensional stress so that said part of said radially inner portion is biased against the peripheral portion of said device.

3. The apparatus of claim 1, wherein said at least one member is elastic so that it yields in response to the application of tensional stresses.

4. The apparatus of claim 3, wherein said element is oscillatable relative to said device about said roving axis due to elasticity of said at least one member.

5. The apparatus of claim 1, further comprising a prime mover for said rotary input device, said prime mover including a combustion engine.

6. The apparatus of claim 1, wherein said input device includes a crankshaft of a combustion engine.

7. The apparatus of claim 1, wherein said input device includes a camshaft of a combustion engine.

8. The apparatus of claim 1, wherein said at least one member is elastic so that it yields in response to the application of tensional stresses, and further comprising at least one driven rotary component receiving torque from said at least one member, said input device including a combustion engine and said element and said at least one rotary component having masses related to the elasticity of said at least one member in such a way that the apparatus has a characteristic frequency less than an idling RPM of the engine.

9. The apparatus of claim 8, wherein said characteristic frequency is less than a minimum RPM of the engine.

10. The apparatus of claim 1, wherein said at least one member is elastic so that it yields in response to the application of tensional stresses, and further comprising at least one driven rotary component receiving torque from said at least one member, said device including a combustion engine, said radially inner portion having a first radius and said peripheral portion having a smaller second radius, the inertia of said element, the ratio of said radii and the elasticity of said at least one member in relation to said at least one component being such that the characteristic frequency of the apparatus is less than a minimum RPM of the engine.

11. The apparatus of claim 1, wherein said peripheral portion has a first diameter and said inner portion has a larger second diameter, the ratio of said diameters being in the range of between 1.5:1 and 5:1.

12. The apparatus of claim 1, wherein said element further comprises a second radially inner portion, said radially inner portions having a common axis of rotation and different diameters, and further comprising a second rotary input device having a second circular peripheral portion, said peripheral portions having a common axis of rotation and said second radially inner portion being eccentric with reference to, spacedly surrounding and including a part in rolling contact with said second peripheral portion.

13. The apparatus of claim 12, wherein said input devices have a common axis of rotation and said peripheral portions have different diameters.

14. The apparatus of claim 12, further comprising a common shaft for said rotary input devices.

15. The apparatus of claim 12, further comprising a driver shaft coaxial with at least one of said input devices and a freewheel between said shaft and said at least one device.

16. The apparatus of claim 12, further comprising a rotary shaft coaxial with at least one of said devices, and an engageable and disengageable clutch between said shaft and said at least one device.

17. The apparatus of claim 16, further comprising a centrifugal mechanism for engaging and disengaging said clutch.

18. The apparatus of claim 16, further comprising a mechanism for engaging said clutch within a first range of RPM of said at least one input device and for disengaging said clutch within a higher second RPM range of said at least one device.

19. The apparatus of claim 16, further comprising means for disengaging said clutch when the RPM of said at least one device is at least close to zero.

20. The apparatus of claim 12, wherein the peripheral portion of one of said devices has a first diameter and the peripheral portion of the other of said devices has a smaller second diameter, and further comprising means for driving said devices, a clutch between said driving means and said one device, and a freewheel between said driving means and said other device.

21. The apparatus of claim 20, wherein said driving means comprises a common shaft for said devices.

22. The apparatus of claim 12, further comprising a rotary shaft coaxial with at least one of said devices, an engageable and disengageable clutch between said shaft and said at least one device, and hydraulic actuating means for said clutch.

23. The apparatus of claim 22, wherein said actuating means comprises a pump.

24. The apparatus of claim 23, wherein said pump is a gear pump.

25. The apparatus of claim 24, wherein said pump comprises an internal gear and a spur gear eccentric relative to and mating with said internal gear.

26. The apparatus of claim 23, wherein said pump comprises a spur gear forming part of said at least one device and an internal gear.

27. The apparatus of claim 26, further comprising a sickle-shaped member between said spur gear and said internal gear.

28. The apparatus of claim 27, wherein said sickle-shaped member has an axis of rotation which coincides with the axis of said internal gear.

29. The apparatus of claim 22, further comprising a common housing for said devices, for said actuating means and for a centrifugal mechanism for engaging and disengaging said clutch.

30. The apparatus of claim 22, wherein said peripheral portions include spur gears and said spur gears include a larger-diameter gear and a smaller-diameter gear, said actuating means including a pump and said larger-diameter gear forming part of said pump.

* * * * *